United States Patent [19]
De Vale

[11] 3,897,798
[45] Aug. 5, 1975

[54] METHOD AND APPARATUS FOR MONITORING AND CONTROLLING HALOGEN LEVELS IN A WATER TREATMENT SYSTEM

[76] Inventor: Donald P. De Vale, Rt. 1, Sycamore, Ill. 60178

[22] Filed: Feb. 26, 1973

[21] Appl. No.: 335,795

Related U.S. Application Data

[63] Continuation-in-part of Ser. No. 181,813, Sept. 20, 1971, Pat. No. 3,724,474.

[52] U.S. Cl. .................. 137/5; 137/88; 137/93; 324/61 R; 324/65 R
[51] Int. Cl. .................... G05d 11/08; G05d 21/02
[58] Field of Search .......... 137/3, 5, 88, 93; 210/62, 210/101; 324/61 R, 65 R

[56] References Cited
UNITED STATES PATENTS
3,724,474  3/1973  De Vale .................. 137/5

Primary Examiner—Robert G. Nilson
Attorney, Agent, or Firm—Hill, Gross, Simpson, Van Santen, Steadman, Chiara & Simpson

[57] ABSTRACT

The halogen level in a water treatment system is monitored and controlled by a method which includes continuous measurement of the halogen level in a flow of the water under treatment, detecting specific insufficient halogen levels, adding halogen in response to detection of specific second insufficient halogen levels, and terminating the addition of halogen upon detection of a second halogen level which is above that of the first-mentioned level. Apparatus for carrying out this method includes a pair of electrodes disposed in a stream of the fluid undergoing treatment, a charge storage device connected across the electrodes (unless the electrodes themselves can store a charge), means for pulsing the electrodes and charged storage device, means for detecting the decay of stored charge as a function of the halogen level of the fluid constituting halogen content and means for controlling the addition of halogen in accordance with desired halogen levels. A second pair of electrodes and storage devices may be disposed in a dehalogenized sample of the liquid as a unique reference and pulsed in synchronism with the first-mentioned electrodes; the decay of the devices being compared in a differential amplifier circuit.

10 Claims, 18 Drawing Figures

$R_\Omega = \dfrac{\Delta E}{\Delta I}$ a FUNCTION OF AREA

METHOD AND APPARATUS FOR MONITORING AND CONTROLLING HALOGEN LEVELS IN A WATER TREATMENT SYSTEM

CROSS REFERENCE TO RELATED APPLICATION

This is a continuation-in-part of my earlier application Ser. No. 181,813, filed Sept. 20, 1971, now U.S. Pat. No. 3,724,474.

BACKGROUND OF THE INVENTION

1. Field of the Invention

This invention is concerned with improving and maintaining the ecological balance in water systems and relates to an improved method and apparatus for measuring and controlling the halogen content of a liquid, particularly water, and is particularly concerned with the utilization of techniques for detecting halogen content of a liquid on a continuous fluid flow, dynamically sensed basis, such as may be employed in water and sewage treatment systems.

2. Description of the Prior Art

The prior art recognizes the use of chlorine (and bromine in shipboard systems), and apparatus for measuring halogen content in water treatment systems is also well known, and now required, to limit the bacteria content in an effluent discharge by providing a minimum halogen level in the liquor, e.g. 2 ppm, before discharge into a watershed.

Heretofore, one method of monitoring and controlling the amount of halogen in a liquid, such as water, was to obtain a sample of the liquid, add appropriate chemicals to the sample of the liquid, measure the color change of the liquid due to the chemical addition, and add halogen in acordance with the results of this somewhat qualitative test.

Other techniques have been employed to either qualitatively or relatively quantitatively measure the halogen content of a liquid with equipment which is generally electronic in nature. One known technique involves the placement of a pair of electrodes in the liquid and applying a steady DC potential thereto. The electrodes are connected to a conductivity sensing device, such as the base-emitter circuit of a transistor, for providing a measure of the conductivity of the fluid across the electrodes. Such a system has proven somewhat unsatisfactory for several reasons. Primarily, the application of a constant DC potential to the electrodes initiates a plating process with the attendant necessity for periodic high level repolarization of the electrodes. A further attendant disadvantage of such a system, when applied to swimming pools and the like, is the general inconvenience caused by the requirement of repolarization. With respect to water supply system, the general increasing inaccuracy as plating increases is undesirable and it would be necessary to resort to charts relating running time and plating to normalize the impedance or conductivity factor at the plated electrodes.

SUMMARY OF THE INVENTION

It is therefore a primary object of this invention to provide new techniques for measuring the content of an impurity in a liquid on the basis of the redox level of the impurity.

Another object of the present invention is to provide an improved method and apparatus for monitoring and controlling halogen level in liquids, particularly in water.

Another object of the invention is to provide an improved method and apparatus for controlling the level of an agent in a liquid by sensing the level of the agent in a relative continuous movement of the liquid with respect to a sensor.

Another object of the invention is to provide an improved method and apparatus for accurately measuring the halogen content in a liquid.

Still another object of the invention is to provide an improved method and apparatus for measuring the halogen level in a liquid by dynamic techniques so as to minimize plating of sensing electrodes disposed in the liquid.

The present invention will be set forth using water and chlorine as examples of the fluid and halogen for treating the fluid since wide application of apparatus embodying the principles of this invention may be made with respect to swimming pools and water and sewage systems.

The oxidation/reduction level of halogens in water are considerably lower than most of the other compounds and salts, acids and bases normally found in or added to water. A resistance versus applied voltage curve can be drawn for water containing a multitude of elements in solution whereby it can be shown that resistance increases as the applied voltage decreases since conduction primarily occurs due to the ionization level and since below a certain level of voltage the electromotive force is insufficient to cause electron flow. However, the halogens extend this level sufficiently below those of other salts or solutions so that measuring the resistance across electrodes disposed in the water at a low voltage level will generate results that are unique to halogens alone.

Because of the foregoing, it has been discovered that the problem of measurement or monitoring of halogen content in water is the ability to measure the resistance of the water at a sufficiently low voltage level so that only the halogen content becomes a factor in the resistivity of the water.

In view of the unique low voltage level resistance characteristic of a halogen-containing fluid, such as chlorine in water, and according to the present invention, the foregoing objectives are realized through the provision of monitoring and control techniques in which the resistance of the fluid is detected on a dynamic basis.

The overall system generally comprises a pair of electrodes disposed in a continuous stream of the liquid, here water, undergoing treatment, a capacitor connected across the electrodes, means for pulsing the electrode and capacitor parallel combination to charge the capacitor and permit discharge thereof in accordance with the resistance of the water. If the pair of electrodes has sufficient capacitance, a separate capacitor is not necessary. A high input impedance detection circuit is utilized to determine when the decaying voltage across the capacitor (electrodes) has decreased to a predetermined level and operates to control apparatus for adding chlorine to the water upon detection of voltage decay to the predetermined level. Circuitry for performing the foregoing function includes a timing circuit which applies, for example, 20 micro-second pulses to the electrodes and a trigger circuit which provides the measurement function. The basic measurement is time and the circuit measures the time required for the capacitor to discharge through the water from 6 volts down to 1/10th volt.

The timing circuit is set for unchlorinated water such that just before the trigger circuit is to function, a second pulse is generated and applied to the capacitor for charging and charge decay. The circuit may include a differential amplifier having a fixed reference at one input and the electrodes connected to the other input; however, a unique reference may be provided by means of a second pair of electrodes disposed in a dehalogenized sample of the liquid being monitored. This latter technique has proven highly advantageous in that impurities generally in the form of salts, may vary from one halogen compound being added to the next and such variations can be compensated or balanced out by the use of a second set of electrodes. If the trigger circuit does not operate, subsequent stages are not activated to add chlorine. It has been determined that time is directly proportional to the resistance of the solution undergoing treatment. Therefore, the frequency of pulsing and the rate of decay are advantageously employed as a time measurement in determining whether chlorine should be added. Rather than be concerned with the provision of an extremely accurate and stable oscillator, the pulse may advantageously be synchronized to the commercial supply.

According to another aspect of the invention, a meter is provided for giving a visual indication of the chlorine content of the treated water. For water which is free of halogen (chlorine), the meter will read zero. As chlorine is added to the water, the time necessary to discharge the capacitor to the 1/10th volt level decreases. Therefore, the firing point of the trigger circuit is reached before the next wave arrives and the amount of time that the trigger circuit is off is directly proportional to the chlorine level of the water. The output waveform is a series of pulses whose duty cycle is integrated to provide the meter output.

BRIEF DESCRIPTION OF THE DRAWINGS

Other objects, features and advantages of the invention, its organization, construction and operation, will best be understood from the following detailed description of a preferred embodiment thereof taken in conjunction with the accompanying drawings, in which.

DESCRIPTION OF THE PREFERRED EMBODIMENTS

Figures 1, 2, 4:
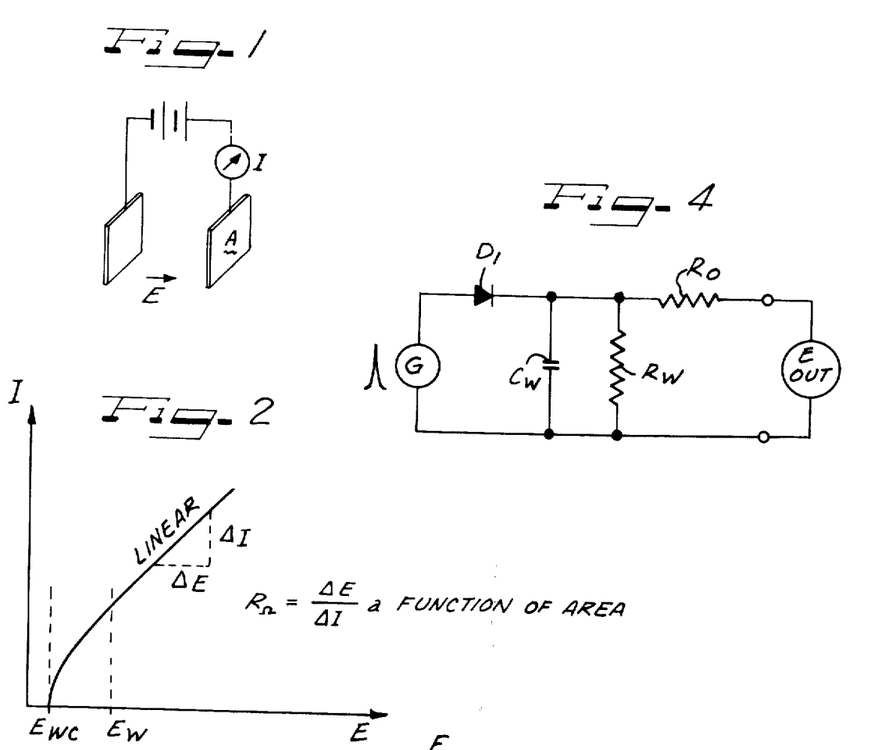
FIGS. 1–10 are schematic circuit diagrams and graphic illustrations of the principles underlying the present invention.

Referring first to FIG. 1 and considering the measurement of the flow of DC current between two neutral electrodes (platinum) immersed in pure distilled water, where the electrostatic field is of sufficient strength to cause ionization of the water molecules, current will flow in proportion to the applied voltage. Assuming that water has no problem of passing between the electrodes (no bubbles), for any voltage larger than a predetermined voltage $Ew$ the current flow will be proportional to the area of the electrodes and the applied electrostatic field. Therefore, Ohm's Law will directly apply. When the applied voltage or field E is less than $Ew$, but greater than $Ewc$, a transition region occurs where statistically less and less molecules ionize until the potential $Ewc$ or cut-off voltage occurs.

Figure 3:
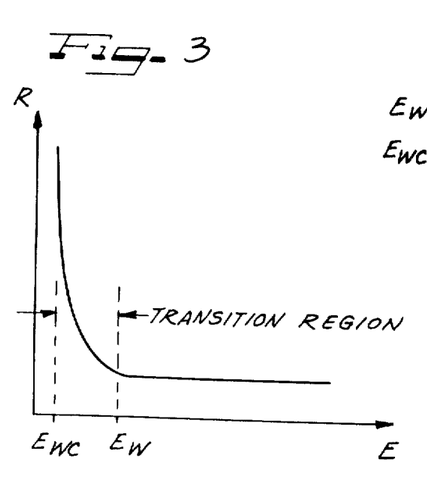
Figure 5:
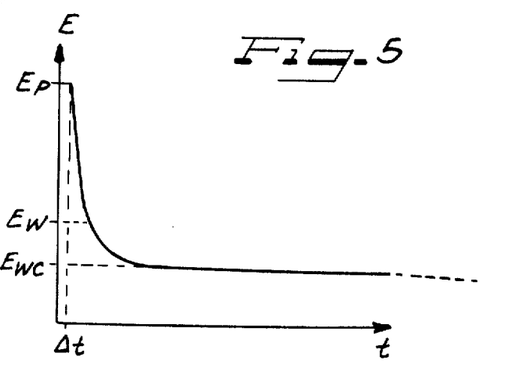

Attention is invited to the curve of resistance versus applied voltage where, in the practical case, dissolved solids in water tend to broaden the transition regions by lower $Ewc$ and possibly raising the level $Ew$. The voltage $Ew$ is at a level at which ionization occurs and is referred to chemically as the redox potential. The addition of halogens in solution with water considerably lowers the net redox level of the water in that halogens ionize at a much lower voltage than other impurities usually found in water.

Referring to FIG. 4, a simplified model of a system according to the present invention is shown. Assume that the resistance $Ro$ is very high and doesn't affect the system, so that the voltage $Eout$ represents the voltage across the capacitor $Cw$. Also assume that the diode D1 is a perfect diode with no leakage current. The capacitor $Cw$ represents the capacitance of the probe electrodes immersed in water. This can be a very high capacitance since water has a high dielectric constant. A resistance $Rw$ represents the current flow or leakage resistance as in FIG. 3. In sequence, the current operation may be described as follows. A pulse from the generator G charges the capacitor $Cw$ to some voltage $Epeak$. Assuming this voltage exceeds the voltage $Ew$ (for water) a very sharp discharge rate will occur until the voltage falls below the potential $Ew$. The curve will then flatten out and asymptotically approach O. If there were no losses in the system, the voltage would decrease to the level $Ewc$ and remain. Since the pulsing continues, the voltage across the capacitor $Cw$ is repetitive as illustrated in FIG. 6, where $Eavg$ is a voltage near the potential $Ew$.

It is important to note that the peak applied voltage and duration ($Epeak$ and pulse width $\Delta T$) can affect the value of $Eavg$. In addition, the period $\Delta T$ or pulse repetition rate can affect the average voltage $Eavg$.

Figures 6, 7:
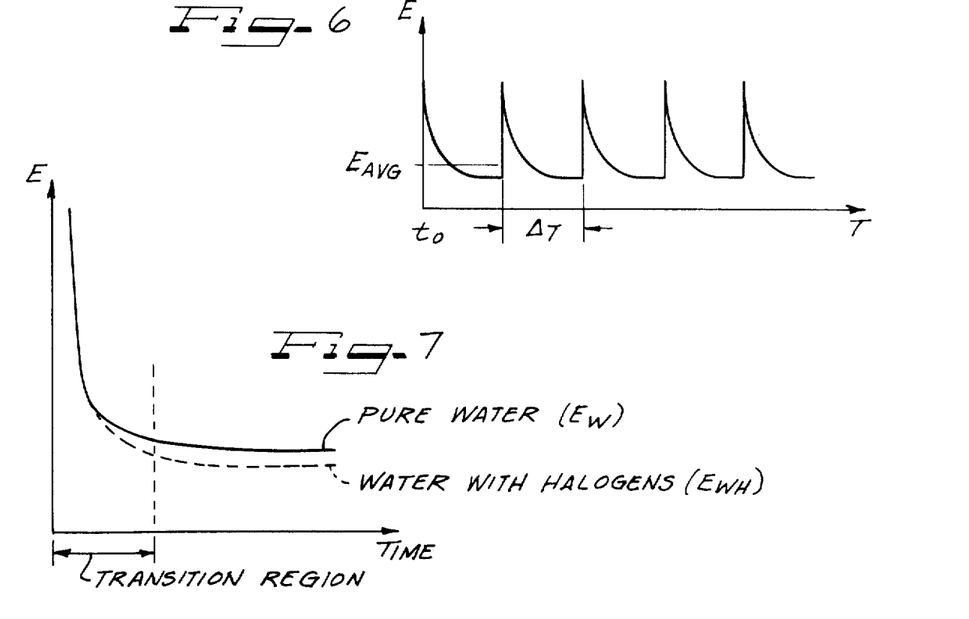

Since addition of halogens (and dissolved solids) will lower the potential $Ew$ of the solution, the potential $Eavg$ will decrease as illustrated in FIG. 7.

The following important points should be noted.

1. It is apparent that if the optimum pulse height $Ep$ and pulse width $\Delta T$ are chosen, the potential $Eavg$ at zero halogen can be located — to minimize effects of other contaminates of higher redox potentials.

2. If the measurement of the potential $Eavg$ is made with the transition region blanked out, effects of contaminates can be further reduced.

3. Increasing the pulse width $\Delta T$ will further reduce effects of contaminates but increase effects of measurement losses.

4. This method is basically a time domain system. A measurement method which is extremely sensitive in the time domain can be described with reference to FIG. 8-10.

Figure 8:
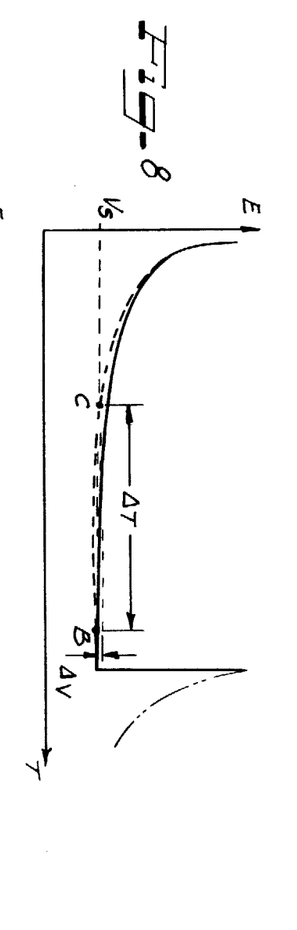
Figure 9:
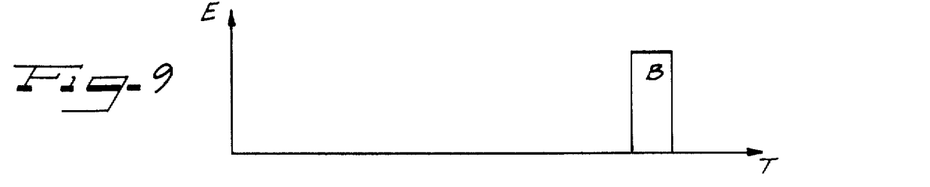
Figure 10:
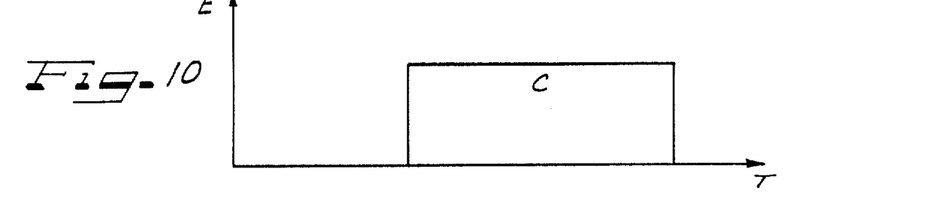

With an output pulse turned on when the probe voltage falls below some voltage Vs. Thus, it is readily apparent that since the slope of the curve is nearly zero, very small changes in halogen will cause very large changes in output pulse widths and accordingly in the potential $E_{avg}$ of the output pulse train.

Realizing that I have discovered a new technique for accurately measuring any substance in any liquid on the basis of its redox potential, the following description is given by way of example with special emphasis on the measuring of chlorine in water since the combination of these elements is universally found in all types of water and sewage treatment facilities.

Figures 11, 12:
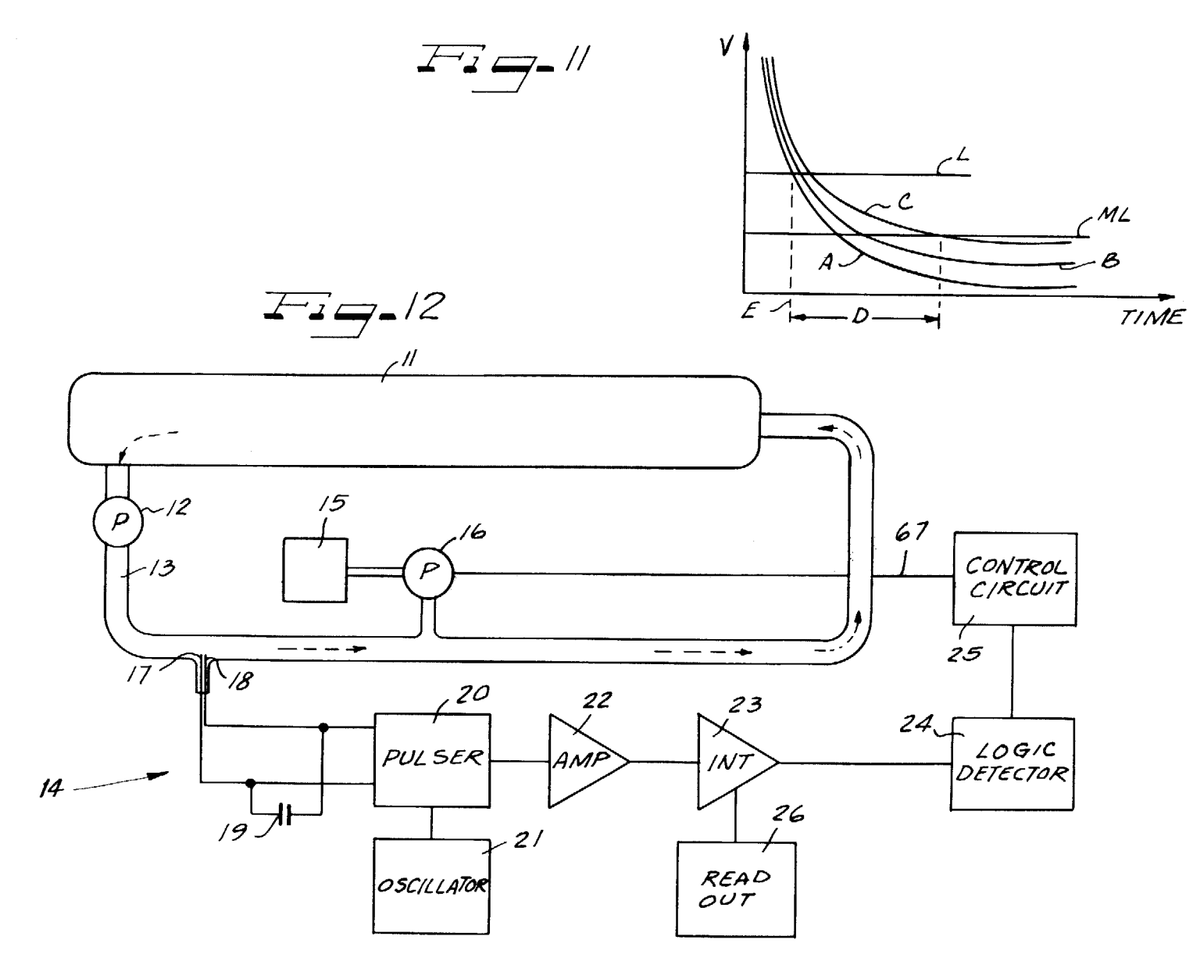
FIG. 11 is a graphical illustration of the voltage decay across a capacitor for water with respect to halogens and other impurities normally added to or found therein.
FIG. 12 is a block diagram of a water treatment system setting forth techniques employed in practicing the present invention.

In FIG. 11, three resistance characteristics of water A, B, and C illustrate how the amount of impurities therein affect resistance of the water between a pair of electrodes with respect to the voltage applied across the electrodes. It has been determined, as mentioned above, that the resistance of water, for example, measured at a low voltage level, is unique with respect to the halogen content of the water. FIG. 11 has not been drawn to any particular scale, but is somewhat exaggerated to illustrate that above a certain voltage level L, the resistance of water changes very little with respect to halogen content and that below the level L, halogens have a unique effect (see above a time level E). Increased halogen levels (curve A is for greater levels of halogen than curve C), the voltage stored in the subject capacitor asymptotically approaches zero along a greater arc than at lower levels. If one singles out a range of voltage for sensing purposes, such as the range D, the spreading of the time to discharge the voltage ML on the curves can quite advantageously be utilized as an accurate indication of halogen content. For example, distilled water having added thereto 1 ppm chlorine has a generally unique resistance characteristic in a range which extends from generally zero to 1.5 volts. If, for example, 0.6 volts are applied across the electrodes, the impedance has been determined to be about 2 megohms. With 0.6 volts applied, 2 megohms would be the resistive component of the time constant for discharging the aforementioned storage capacitor. With halogen added, the effective resistance would be less thereby increasing the discharge rate (decreasing discharge time). These characteristics and their utilization will best be understood from the following description of a monitoring and control system constructed in accordance with the principles of the invention.

Referring to FIG. 12, a water treatment system is generally illustrated at 10 as comprising a reservoir 11, such as a commercial water supply or a swimming pool, a pump 12 for circulating water from the reservoir 11 through a conduit 13 and back to the reservoir, and a control system generally referenced 14 for controlling the addition of chlorine from a chlorine source 15 to the stream of water traversing the conduit 13 by way of a pump 16.

The control system 14 includes a probe having a pair of spaced electrodes 17, 18 which are disposed in the continuous flow of water through the conduit 13. These electrodes may advantageously be constructed of platinum. Relative movement of the liquid vis-a-vis the probe may also be provided by agitating the liquid or moving the probe, rather than by pumping the liquid. A capacitor 19 is connected across the electrodes 17 and 18 and the parallel combination is fed by a pulser 20 that is driven by an oscillator 21. The probe electrodes may have sufficient capacitance to function in the desired manner; therefore, in the following discussion the charge storage and decay functions of the capacitor 19 may advantageously be carried out by the probe electrodes.

The capacitor 19 is connected by way of the pulser 20 to an amplifier 22 which takes the form of a trigger circuit for generating a pulse waveform. The waveform is operated on by an integrator 23 and utilized to control a logic detector 24 which in turn operates a control circuit 25 to control the operation of the pump 16 and the addition of halogen to the conduit 13. The integrator 23 has connected thereto readout apparatus 26 for providing a visual display of chlorine content of the water.

Figures 13, 14:
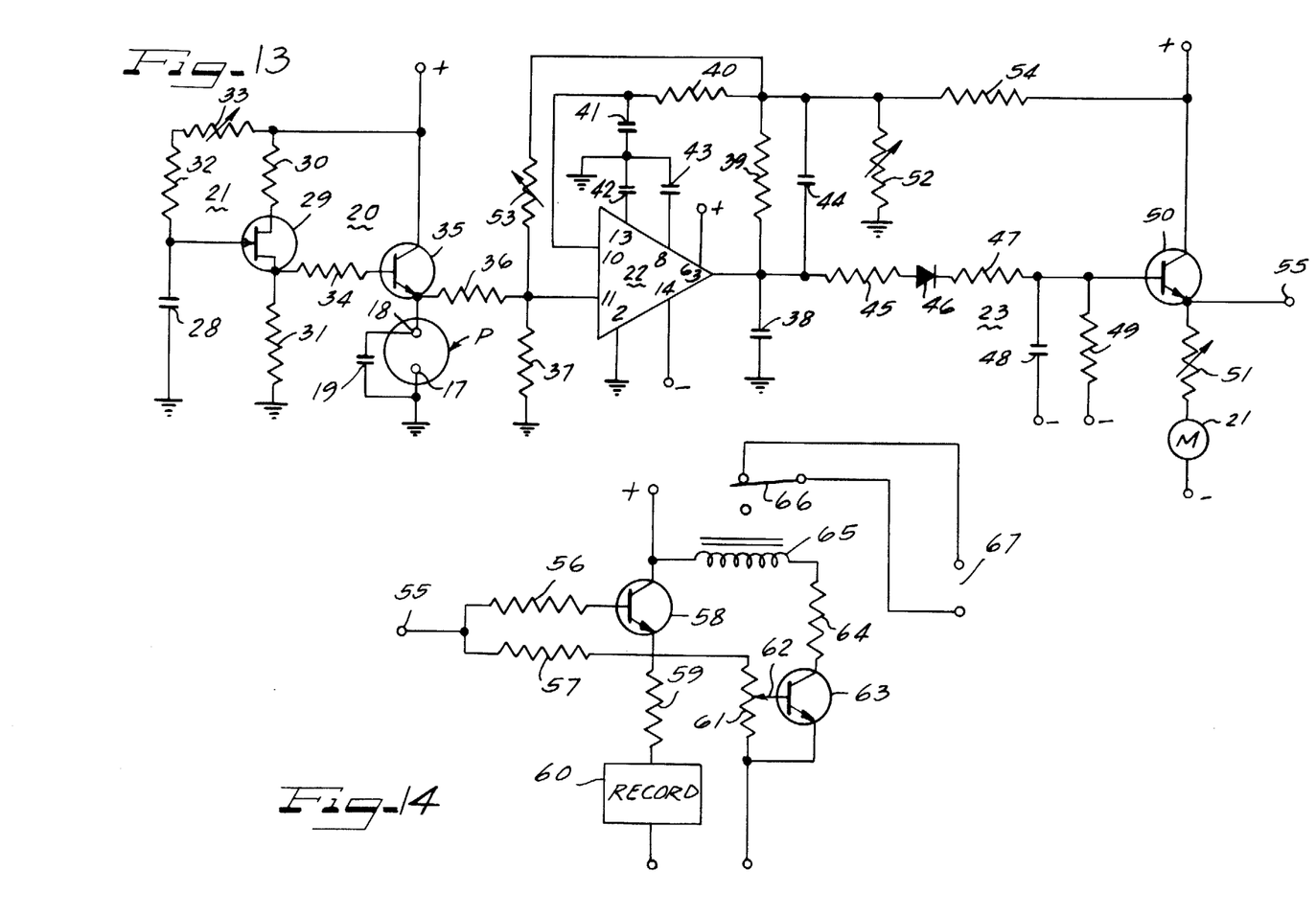
FIG. 13 is a schematic circuit diagram of a portion of the system illustrated in FIG. 11.
FIG. 14 is a schematic circuit diagram of another portion of the system illustrated in FIG. 11.

Referring to FIG. 13, a portion of the control system 14 is illustrated including the electrodes 17, 18 connected in a probe P and shunted by the capacitor 19, the oscillator 21, the pulser 20, the trigger circuit 22 and the integrator 23. Also illustrated is a portion of the readout apparatus 26 in the form of a meter 27.

The oscillator 21 includes a capacitor 28 connected between ground and the emitter electrode of a unijunction (UJT) 29, which has another electrode thereof connected by way of a resistor 30 to a positive supply potential and a third electrode thereof connected by way of a resistor 31 to ground. The emitter electrode of the UJT transistor 29 and the capacitor 28 are connected to the positive supply potential by way of a resistor 32 and a variable resistor 33 which is adjustable to change the frequency of oscillation. The oscillator is a simple relaxation oscillator of the type well known in the art and no further discussion thereof is deemed necessary. The UJT transistor 29 is utilized to couple the output of the oscillator by way of a resistor 34 to the base of a transistor 35 of the pulser 20. The transistor 35 includes a collector which is connected to the positive electrical supply potential and an emitter which is connected to the electrode 18 of the probe P and to the capacitor 19 connected in shunt across the electrodes 17, 18.

The amplifier circuit 22 may include a well-known integrated circuit such as an RCA CA3047 connected as a trigger circuit and having a high input impedance supplied thereto by way of a resistor 36 and a resistor 37. The trigger circuit 22 includes a plurality of components 38-43 for maintaining stability and the proper frequency response as is well known in the art. The trigger circuit 22 operates in conjunction with an integrator 23 which comprises a capacitor 44, a resistor 45, a diode 46, a resistor 47, and a capacitor 48. The trigger circuit 22 and the integrator 23 are operable in two modes. In one of these modes, the circuits are dimensioned so that the integrator 23 integrates the duration of the output of the trigger circuit 22 relative the duration of the oscillator pulse wherein the charging of the capacitor 48 with respect to a negative potential by way of the resistor 39, the resistor 45, the diode 46 and the resistor 47. The integrated signal derived across the capacitor 48 and a resistor 49 in parallel therewith is applied to the base of a transistor 50. The transistor 50 has its collector connected to the positive supply potential and its emitter connected to the negative supply potential by way of a variable resistor 51 and the meter 27. The meter therefore responds to the integrated signal to provide a reading that is representative of the chlorine content of the water. The resistor 51 may be adjusted to calibrate the meter 27.

In another mode of operation, the trigger circuit 22, which has a variable resistor 52 for setting its trigger level by way of the resistor 40, is provided with a feedback loop from its output to its signal sensing input by way of the resistor 39 and a variable resistor 53 which may be adjusted so that the negative feedback desensitizes the trigger circuit to decrease the gain of the amplifier whereby the output is the decay waveform of the input (inverted) so that less output at the probe P provides a greater output for the amplifier. This also provides for an extremely accurate response with respect to low level signals and, as stated above, it is at such low level signals that halogens provide a unique resistance characteristic. For example, such a level would advantageously be approximately 0.6 volts. In this mode, the integrator 23 is accordingly provided with signals for integration and display at the meter 27 that are of a higher ratio with respect to the input signals.

The trigger circuit 22 and the integrator 23 are provided with a resistor 52 as a means of deriving bias and trigger potentials, as is well known in the art.

The logic detector 24 and the control circuit 25 may take many forms. In FIG. 14, the circuits have been combined to perform the functions of logic detection, pump control governing the addition of chlorine, and controlling the recording of halogen content over a predetermined period of time. The circuit of FIG. 14 includes an input terminal 55 which is connected to the like numbered terminal 55 of the emitter of the transistor 50 to extend the integrated signal to the base of the transistor 58 by way of a resistor 56. The collector of the transistor 58 is connected to the positive supply potential and the emitter is connected to the negative supply potential by way of a resistor 59 and a recorder 60 which may be one of many well known types wherein a pen or the like is operated in response to the signal to mark a paper strip or disc.

The signal at the terminal 55 is also fed to the base of a transistor 63 by way of a resistor 57 and a variable resistor 61 having a movable tap 62 connected to the base of the transistor 63. The emitter of the transistor 63 is connected in common with the resistor 61 to the negative supply potential and the collector is connected to the positive supply potential by way of a resistor 64 and a relay winding 65. The resistor 61 may be set to a predetermined bias potential for the transistor 63 so that the transistor operates upon detection of a level of the integrated signal which is representative of a desired level at which chlorine is to be added to the water as detected at the probe P, for example at 1/10th volt. Detection of this level at the probe P, as reflected at the resistor 61, causes the transistor 63 to conduct and the relay winding 65 to be energized. This in turn opens the relay contacts 66 to deactivate the pump 16 which is connected to the output terminals 67. When the chlorine level falls below this predetermined amount, the transistor 63 is rendered nonconductive to de-energize the relay winding 65 and to permit the contacts 66 to close. The pump 16 is therefore activated to add chlorine from the source 15 to the conduit 13. It should be noted in FIG. 12 that the addition of chlorine takes place downstream with respect to the sensing electrodes 17, 18 so that the proper dilution takes place in the reservoir 11 and also prevents inaccurate sensing of high chlorine levels downstream from the pump 16.

Figure 15:
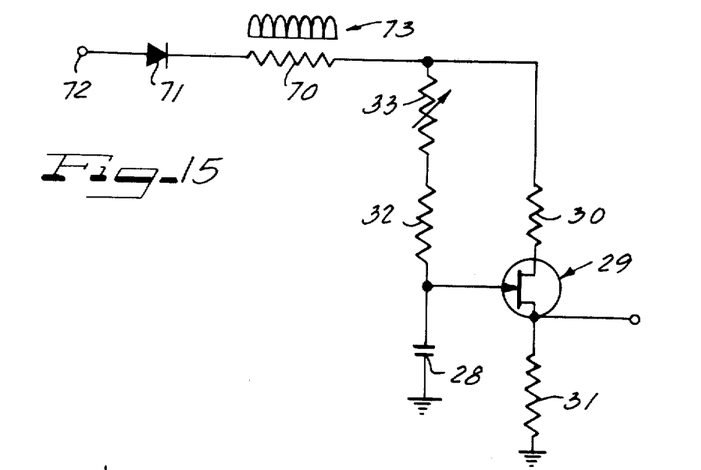
FIG. 15 is a schematic circuit diagram of a line synchronized oscillator for use in the apparatus of FIG. 11 in place of the oscillator of FIG. 13.

FIG. 15 illustrates synchronization of the oscillator, the same reference numerals being used where applicable as were used in FIG. 13. In FIG. 15, a unijunction transistor 29 has one of its basis connected to ground by way of a resistor 31 and the other of its basis connected to its emitter by way of a variable resistor 33 and a fixed resistor 32. The emitter is also connected to ground by way of a capacitor 28. The junction between the resistors 30 and 33 is connected to an input terminal 72 by way of a resistor 70 and a diode 71 which is poled for conduction toward the emitter of the unijunction transistor 29. The input terminal 72 receives a full-wave rectified signal 73 which is advantageously derived from the commercial mains to provide a 120 cycle repetition rate.

Figure 16A:
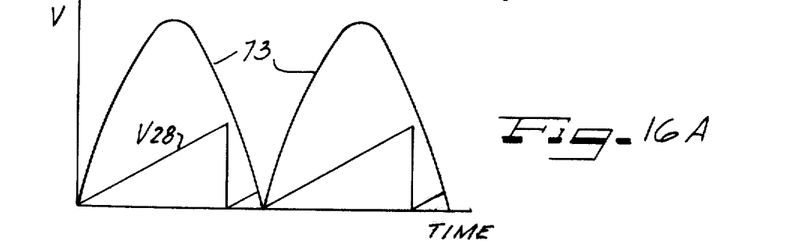
FIGS. 16a and 16b are wave forms of the oscillator of FIG. 15.
Figure 16B:
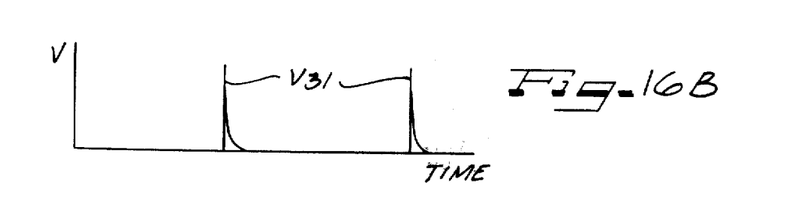

FIGS. 16A and 16B are aligned with respect to time and illustrate the operation of the unijunction circuit of FIG. 15 for two cycles of the full-wave rectified input signal 73. Referring to FIG. 16A, as a cycle of input voltage progresses, the capacitor 28 is charged (voltage V28) toward the firing potential of the unijunction transistor 29. At the firing potential, denoted by the peak of the charging waveform, the unijunction transistor turns on to quickly discharge the capacitor 28 and provide a pulse across the output resistor 31. This pulse is seen in FIG. 16B as a pulse V31. Experience shows that the commercial supply in most locations varies only slightly and at a slow rate. Therefore, synchronization to the commercial supply is highly advantageous.

Figure 17:
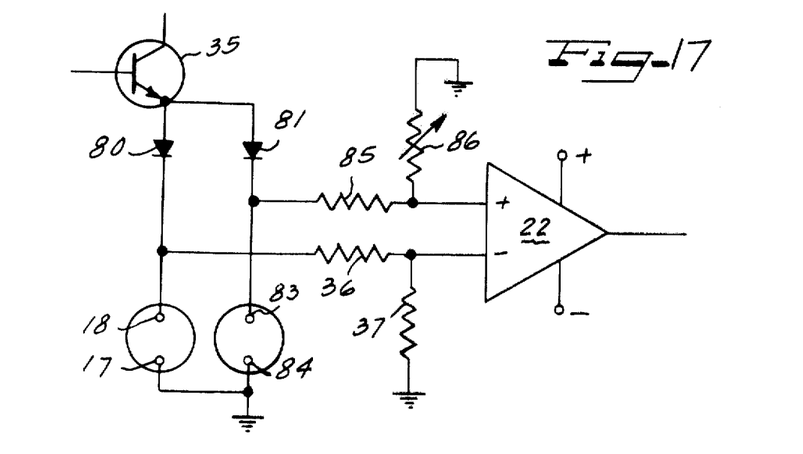
FIG. 17 is a schematic circuit diagram of a dual probe embodiment of the invention.

Referring to FIG. 17, and keeping in mind that this circuit of FIG. 15 may be employed in connection with the circuit of FIG. 17, a two probe monitoring circuit is illustrated as would replace the one probe circuit between the output of the transistor 35 and the differential amplifier 22 in FIG. 13.

The circuit of FIG. 17 includes a probe having a pair of electrodes 17, 18 for disposition in a sample, as previously described, connected to the emitter of the transistor 35. A second probe having a pair of electrodes 83, 84 is also connected to the emitter of the transistor 35, isolation between the probes being effected by respective diodes 80 and 81. The probe having the electrodes 83, 84 is placed in a container having a second sample of the liquid being monitored. For example, the apparatus may be used to monitor the chlorine content of water. In this case, the second sample is dehalogenized (dechlorinated) to provide a unique reference for each measurement. This has been found highly advantageous in that the amount of impurities other than halogens (the upper parts of the curves in FIG. 11) vary, not only from location to location, but from one halogen additive to the next. Therefore, with the halogen removed, only the liquid and the other impurities remain as a basis against which halogen content is measured.

As in FIG. 13, the electrode 18 is connected by way of a resistor 36 to one input of the differential amplifier 22. The other input to the differential amplifier is, however, connected to the electrode 83 of the second probe by way of a resistor 85. This same input terminal of the differential amplifier is also connected to ground by way of a resistor 86 which is provided as a variable resistor for adjusting the circuit. With the circuit adjusted for a zero output, any decreasing signal provided by the electrodes 18, 17 will drive the output of the amplifier positive, as an exemplary circuit operation.

From the foregoing, it is readily evident that the objects of the present invention have been met to provide a continuous monitoring and control process which requires no separate monitoring or addition of testing chemicals. The total system is therefore substantially a maintenance free system. It has also been shown that the present invention provides for the calibrated continuous readout of halogen content of the fluid being treated or measured. The present invention further provides means by which the halogen level may be controlled such that swimming pools, public water sources, and sewage treatment may be monitored and controlled on a continuous and dynamic basis. Also, this system is applicable to laboratory measuring devices. It has further been disclosed that the foregoing advantages can be realized through the provisions of simple techniques and circuit means for switching on and off pumps in response to a demand signal, and that the demand signal may be advantageously derived from a very low level voltage across sensing electrodes disposed in the fluid, which low level voltage is advantageously related to resistance characteristics which are unique to halogens and which may be extended to other substances for which a unique voltage (oxidation/reduction) level can be defined.

Although I have disclosed my invention by reference to a specific illustrative embodiment thereof, many changes and modifications of my invention may become apparent to those skilled in the art without departing from the spirit and scope of the invention, and it is to be understood that I intend to include within the patent warranted hereon all such changes and modifications as may reasonably and properly be included within the scope of my contribution to the art.

I claim:

1. Apparatus for measuring the content of a substance having a predetermined redox potential in a liquid comprising:

probe means including a pair of capacitively coupled electrodes disposed in the liquid;

means for periodically pulsing said electrodes with a voltage pulse having a peak value slightly above the predetermined redox potential of the substance to store a charge in the capacitance thereacross, the stored charge decaying between pulses via the liquid between the said electrodes at a rate governed by the content of the substance in the liquid;

means for sensing the charge across said electrodes and operable to generate a substance level indication signal; and display means operable in response to the substance level indication signal to provide a visual display of the substance content.

2. Apparatus for monitoring the halogen content of the liquid, comprising:

first probe means including a pair of capacitively coupled first electrodes disposed in the liquid being monitored;

second probe means including a pair of capacitively coupled second electrodes disposed in a dehalogenized sample of the same liquid;

means for repetitively pulsing said first electrodes and said second electrodes to store charges in the respective electrode coupling capacitances, the voltages across the respective electrodes decaying due to discharging by way of the respective electrodes and the resistance of the liquid therebetween; and means for comparing the voltages across said first and second electrodes and generating a signal when the difference between the voltages across said first and second electrodes reaches a predetermined difference.

3. Apparatus for monitoring the halogen content of the liquid, according to claim 2, wherein said means for repetitively pulsing said first and second electrodes comprises an oscillator, means connecting the output of said oscillator across said first electrodes and across said second electrodes, and means for synchronizing said oscillator to an alternating supply wave.

4. Apparatus for monitoring the halogen content of the liquid, according to claim 3, wherein said means connecting the output of said oscillator across said first and second electrodes comprises at least one first diode connected between the oscillator and one of said first electrodes and at least one second diode connected between the output of the oscillator and at least one of said second electrodes, said diodes poled in the same direction with respect to the output of said oscillator.

5. Apparatus for monitoring the halogen content of the liquid, according to claim 2, wherein said means for comparing voltages comprises a differential amplifier having a pair of inputs, one of said inputs connected to one of said first electrodes and the other of said inputs connected to one of said second electrodes.

6. Apparatus for monitoring and controlling the halogen content of the liquid, according to claim 5, wherein said comparing means further includes means connected to said other input of said differential amplifier for adjusting and superposing an input level at said other input.

7. A method of monitoring the halogen content of the liquid comprising the steps of:

pulsing a first charge storage device having electrodes in the liquid being monitored and permitting the charge to decay via the liquid between the electrodes;

pulsing a second charge storage device having electrodes in a dehalogenized sample of the same liquid and permitting the charge to decay via the liquid between the electrodes;

comparing the charge decay of the two storage devices; and generating a signal when the difference in the charge decay is greater than a predetermined amount.

8. A method of controlling the halogen content of the liquid, according to claim 7, comprising the step of:

adding halogen to the liquid in response to the generated signal.

9. A method of controlling the halogen content of the liquid according to claim 7, comprising the steps of:

repetitively pulsing the charge storage devices and repetitively generating a signal in response to decay differences greater than said predetermined amount;

generating a signal indicative of halogen level in response to the repetitive signal; and displaying the halogen level in response to the halogen level signal.

10. A method of controlling the halogen content of the liquid according to claim 9, comprising the step of:

adding halogen to the liquid when the halogen level signal falls below a predetermined level.

* * * * *